United States Patent [19]
Fujiwara et al.

[11] Patent Number: 4,643,556
[45] Date of Patent: Feb. 17, 1987

[54] AUTOMATIC FOCUSING ADJUSTMENT DEVICE

[75] Inventors: Akihiro Fujiwara, Kanagawa; Kazuo Tanaka, Tokyo, both of Japan

[73] Assignee: Canon Kabushiki Kaisha, Tokyo, Japan

[21] Appl. No.: 739,382

[22] Filed: May 30, 1985

[30] Foreign Application Priority Data

Jun. 1, 1984 [JP] Japan .................... 59-112747
Jun. 1, 1984 [JP] Japan .................... 59-112748
Jun. 1, 1984 [JP] Japan .................... 59-112749

[51] Int. Cl.$^4$ .................... G03B 3/00; H04N 5/238
[52] U.S. Cl. .................... 354/406; 358/228
[58] Field of Search ............ 354/402, 403, 406–408, 354/476–479; 352/140; 358/227, 228; 250/201, 201 AC, 204, 216, 578

[56] References Cited

U.S. PATENT DOCUMENTS 4,533,226 8/1985 Odone .................... 354/403

FOREIGN PATENT DOCUMENTS 42507 3/1984 Japan .................... 354/408

Primary Examiner—William B. Perkey
Attorney, Agent, or Firm—Toren, McGeady and Goldberg

[57] ABSTRACT

In the disclosed device, a beam splitting member splits the light reflected from an object to be photographed into two parts. One part of the split-off light is reflected back through the beam splitting member to a photoelectric transducer. An output signal from the photoelectric transducer is used for focusing adjustment.

4 Claims, 10 Drawing Figures

AUTOMATIC FOCUSING ADJUSTMENT DEVICE

BACKGROUND OF THE INVENTION

This invention relates to still cameras and video cameras, and more particularly to automatic focusing adjustment devices of the so-called TTL passive type in which light from an object to be photographed is received by a photographic optical system, and the output used in part for focus adjustment.

DESCRIPTION OF THE PRIOR ART

Most photographic optical systems used in recently developed video cameras are of the variable focal length type, or so-called zoom lens optical systems. Zoom lenses of this kind are generally constructed with four lens components as shown by elements 1 to 4 in FIG. 1. In more detail, the first component 1, counting from the front, contributes to the focus adjusting process; the second component 2 is a variator; the third component 3 is a compensator; and the fourth component 4 forms an image on an image pickup plane. In FIGS. 1 to 4, element 5 denotes a stop, and element 6 denotes a light sensor for photography. Because the first to the third components constitute an afocal system, building an optical finder in such a zoom lens involves positioning a beam splitter composed of a half-mirror inclined at an angle 45° with an optical axis behind the compensator 3 to split off part of the light coming from the afocal system to a finder optical system. Also, to build an automatic focusing adjustment device of the TTL passive type in the same photographic optical system, as shown in FIG. 2, a half-mirror in a glass block 7 is positioned behind the compensator 3 and oriented at an angle of 45° to the optical axis to split off part of the photographic light for passage to an optical focus-adjustment system 8. A real image is formed on a light sensor 9 that serves for focus adjustment.

In this case, the focus-adjustment light sensor 9 has restricting conditions to the photographic light sensor 6, for example, image pickup tube or solid state image pickup element. First, regardless of the type of focus adjustment employed, i.e. the trigonometrical survey type, or the image sharpness detecting type, a very large dynamic range of light energy is necessary. This is so because the optical system is usually used at full open aperture or at a constant aperture near full open. Secondly, in any focus adjustment, a special optical system must be arranged in front of the photoelectric transducer portion of the light sensor, and the photoelectric transducer portion must correspond thereto.

Because of the presence of these restricting conditions, it is difficult to significantly reduce the size of the module including the special optical system of the focus adjustment light sensor 9. On the other hand, the photographic light sensor 6, regardless of whether it is an image pickup tube or a solid state image pickup element, has become increasingly smaller in size. In the case of the image pickup tube, the size has been reduced from ⅔ inch to ½ inch. Further, recently, even a ⅓ inch tube has been put into actual use.

Thus, while the size of the photographic light sensor 6 has become progressively smaller, the size of the focus-adjustment light sensor 9 has not been reduced in proportion thereto. Therefore, the relative size of the focus adjusting light sensor 6 to the photographic light sensor 9 is large.

The ratio of the amount of area of the picture frame used for focusing adjustment to the total area of the picture frame, i.e. the focusing adjustment field percentage, depends largely on the condition of the object, the photographic technique of the photographer, and, further, the photographer's taste. If there is optimum value for the ratio, for example, ⅓ in each of the horizontal and vertical lengths of the entire area, the focal length of the focusing adjustment system must be a very large value as compared to the focal length of the photographic optical system.

To cite a concrete example, for the combination of an image pickup tube whose horizontal width is for example 8 mm, and a 6 mm focusing adjusting light sensor, the focal length of the focusing adjustment system must be equal to 2.25 times the focal length of the photographic optical system to form a focus adjustment target field rate of ⅓. As is understandable from this example, it is unavoidable that the length of the barrel of the focusing adjustment optical system that follows the half-mirror is very long.

To eliminate such a problem, in actual practice, as shown in FIG. 3, the optical path of the focusing adjustment optical system is bent by a total reflection mirror 10 to minimize the size. With respect to the volume, however, no decrease in size results. Further, in terms of lens interchangeability, if a screw-type mount is used, for example, the C mount presently employed in cameras for ENG, a problem arises that the bent barrel must be protrude rearwardly of the flange of the mount.

Thus, prior art TTL passive type automatic focusing adjustment devices are not very small in size as compared to outside measurement type of automatic focusing adjustment devices.

SUMMARY OF THE INVENTION

An object of the invention is to eliminate the above-described conventional problems and to provide an automatic focusing adjustment device which enables the size of the lens unit for the camera to be minimized. To achieve this and other objectives, the present invention is constructed with a light splitting member arranged in the photographic optical system, a lens for focusing adjustment which refracts the part of the light split-off by the light splitting member, a mirror for reflecting the light refracted by the lens for focusing adjustment back to the lens for focusing adjustment and a light sensor for focusing adjustment arranged in such a position as to receive the light refracted again by the lens for focusing adjustment and further passed through the light splitting member.

DETAILED DESCRIPTION OF THE PREFERRED EMBODIMENTS

Figure 1:
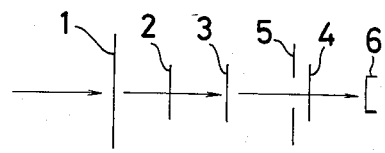
FIGS. 1 to 3 are schematic diagrams of a zoom optical system illustrating the prior known automatic focusing adjustment device.
Figure 2:
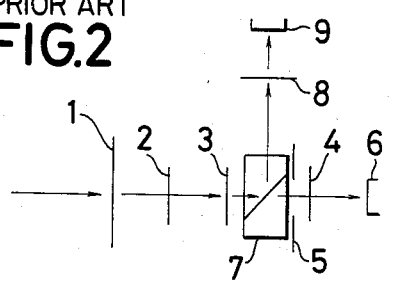
Figure 3:
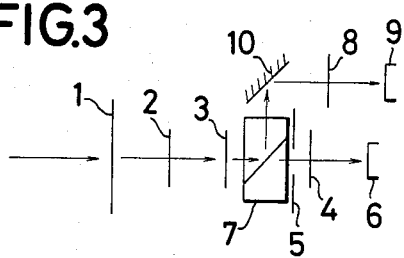

The present invention is described in connection with embodiments thereof by reference to FIGS. 4 to 8, wherein the reference numerals 1 to 9 denote the same parts as those shown in FIGS. 1 to 3.

Figure 4:
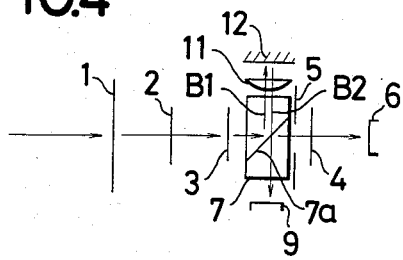
FIGS. 4 to 6(b) illustrate a first embodiment of the invention, with FIG. 4 being a diagram of an optical arrangement, and FIGS. 5(a) to 6(b) illustrating the details of the main parts.

FIG. 4 illustrates an embodiment of the invention. A half-mirror block 7 having formed therein a half-mirror surface 7a inclined at an angle of 45 degress with an optical axis of the photographic system is arranged in an afocal portion of the photographic optical system and in front of a diaphragm 5. Light B1 split off by the half-mirror surface 7a is collected by a lens 11 for focusing adjustment, then transmitted by total reflection back from a plane mirror 12, then collected again by the lens 11 for focusing adjustment and then passed through the half-mirror block 7, reaching the light sensor 9 for focusing adjustment.

Figure 5A:
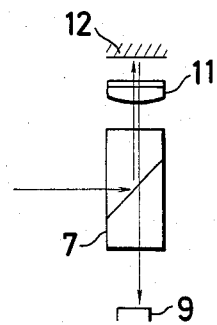
Figure 5B:
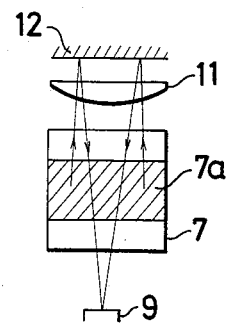
Figure 6A:
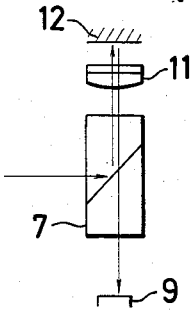
Figure 6B:
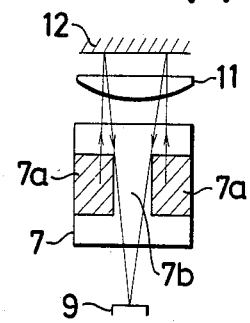

FIGS. 5(a) and 5(b) and FIGS. 6(a) and 6(b) illustrate the details of the main parts, with FIG. 5(a) and FIG. 6(a) being side views, and FIG. 5(b) and FIG. 6(b) being front views. In FIG. 5(b) and FIG. 6(b), the hatched area represents the half-mirror surface 7a.

In FIGS. 5(a), and 5(b), the half-mirror surface 7a is provided over the entire width of the block.

In FIGS. 6(a) and 6(b), the half-mirror surface 7a is divided into right and left hand parts with a transparent part 7b intervening therebetween. In this case, the light total-reflectedly from the plane mirror 12 passes through the intermediate or transparent part 7b to reach the light sensor for focusing adjustment. By providing such a transparent part 7b, the part of light split-off by the half-mirror surface 7a is not reflected again by the half-mirror surface 7a, and reaches the light sensor 9 for focusing adjustment very efficiently. Therefore, as compared with the case of FIGS. 5(a) and 5(b), even an object of lower brightness level can be detected.

Figure 7:
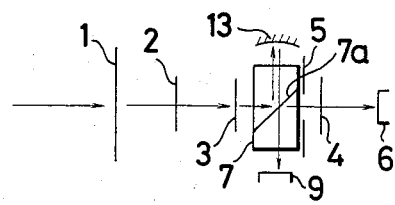
FIGS. 7 and 8 are schematic diagrams illustrating other embodiments of the invention.
Figure 8:
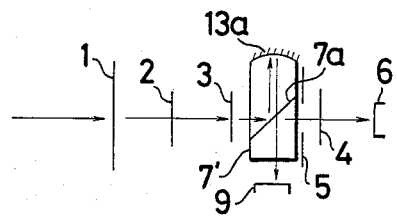

FIGS. 7 and 8 illustrate other embodiments of the invention.

FIG. 7 illustrates an example of using a concave mirror for reflecting the light split by the beam splitting member, wherein the same reference numerals denote the similar parts to those shown in FIG. 4. The half-mirror block 7 having formed therein a half-mirror surface 7a inclined 45° with the optical axis of the photographic system is arranged in an afocal space between the compensator 3 and the diaghram 5. The light split-off by the half-mirror mirror 7a is totally-reflected by a concave mirror 13, then while converging, transmitted backward, and then passed again through the half-mirror block 7, reaching the light sensor 9 for focusing adjustment.

FIG. 8 illustrates another embodiment of the invention. In this case, the concave mirror 13 of FIG. 7 is unified with the half-mirror block 7 to form a special half-mirror block 7'. In other words, the top end surface of the half-mirror block 7 is formed to a spherical shape and made to be a reflecting surface 13a.

As has been described above, the automatic focusing adjustment device according to the present invention is so constructed that the split-off light by the half-mirror is refracted by a lens for focusing adjustment, then, after having been total-reflectedly by a plane mirror, refracted again by the lens for focusing adjustment, and finally made to pass through the half-mirror to the light sensor for focusing adjustment. Thus, the prior art space required for the barrel of the optical system from the half-mirror to the sensor for focusing adjustment becomes common with the space the half-mirror occupies; minimization of the size and compactness of the lens unit for a camera including the automatic focusing adjustment device.

Also, when the half-mirror block 7' having the concave reflection surface 13a of FIG. 8 is used, the necessary number of parts is reduced, and the adjusting operation in the assembly line is simplified the adjusting operation is the assembly line is simplified aspherical shape, the accuracy of focusing adjustment is improved, and the structure of construction of the correcting optical system is simplified. Further, when the central portion of the half-mirror surface 7a is made 100% permeable, as the light reflected by the concave mirror 13 passes this central or transparent portion, the amount of light received by the light sensor 9 is increased so that even the object of low brightness can be detected.

What is claimed is:

1. An automatic focusing adjustment device comprising:
    (a) a light beam splitting member arranged in a photographic optical system, having an imaging component, to split light reflected from an object to be photographed to a focal plane direction and a second direction different from the focal plane direction;
    (b) a first reflection mirror in the path of the light split to said second direction, said first reflection mirror being arranged so that the light reflected by said first reflection mirror passes through said beam splitting member; and
    (c) an element for receiving the light passed through said beam splitting member;
    (d) said light beam splitting member being located between the imaging component and the object to be photographed;
    and further comprising a lens for focusing adjustment arranged between said beam splitting member and said first reflection mirror to refract the light split by said beam splitting member.

2. An automatic focusing adjustment device comprising:
    (a) a light beam splitting member arranged in a photographic optical system, having an imaging component, to split light reflected from an object to be photographed to a focal plane direction and a second direction different from the focal plane direction;
    (b) a first reflection mirror in the path of the light split to said second direction, said first reflection mirror being arranged so that the light reflected by said first reflection mirror passes through said beam splitting member; and
    (c) an element for receiving the light passed through said beam splitting member;
    (d) said light beam splitting member being located between the imaging component and the object to be photographed;
    and wherein said beam splitting member is a half mirror fixed in inclined relation to a photographic optical axis, the half mirror surface of said half mirror being provided in plural segments defining a transparent part therebetween, the light reflected by said half mirror surfaces being reflected by said first reflection mirror, passed through said transparent part and received by said light receiving element.

3. An automatic focusing adjustment device according to claim 2, wherein said first reflection mirror is a portion of said beam splitting member and comprises a concave mirror.

4. An automatic focusing adjustment device according to claim 2, wherein a portion of said beam splitting member comprises a concave mirror.

* * * * *